Dec. 9, 1952          J. A. CAMPBELL          2,620,819
LIQUID LEVEL CONTROL SYSTEM
Filed April 30, 1948
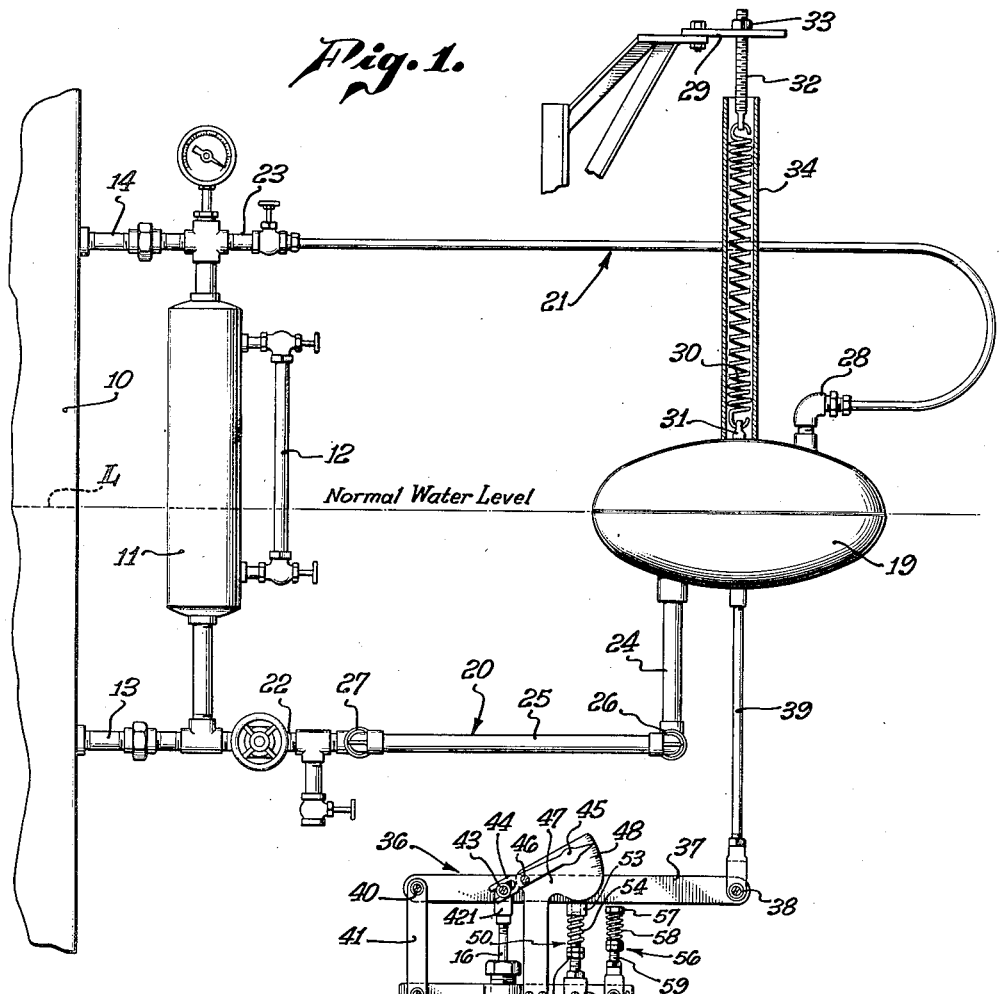
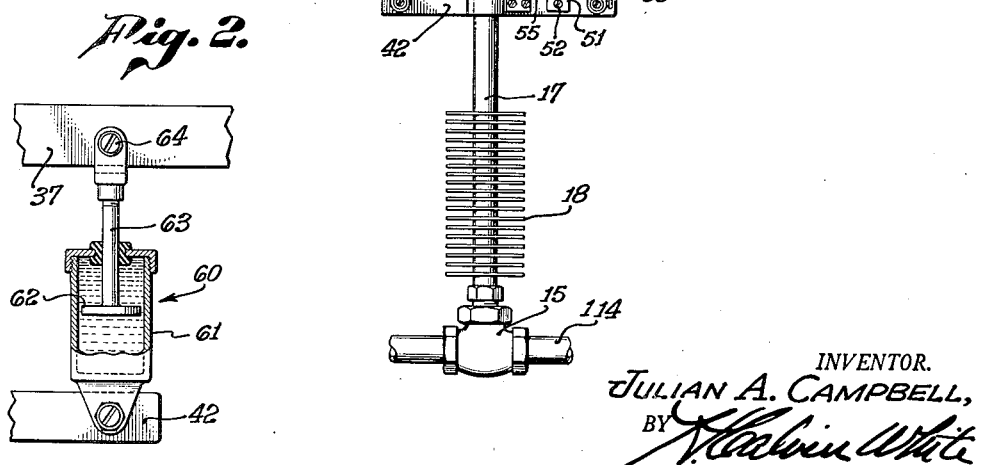
INVENTOR.
JULIAN A. CAMPBELL,
BY
ATTORNEY.

Patented Dec. 9, 1952

2,620,819

UNITED STATES PATENT OFFICE 2,620,819

LIQUID LEVEL CONTROL SYSTEM

Julian A. Campbell, Long Beach, Calif.

Application April 30, 1948, Serial No. 24,252

6 Claims. (Cl. 137—407)

This invention has to do with improved equipment for the control of liquid levels, the invention being generally applicable to various types of installations where liquid level control is involved. Since one of its major adaptations is for boiler water level and feed control, the invention will be described typically in connection with such equipment.

My primary purpose in developing the present invention has been to achieve and assure greater precision in liquid level control, than is attainable by any of the usual or known types of regulators. Particularly contemplated is a regulator system that will assure maintenance of the boiler water at predetermined level, and without any considerable changes from that level, under all normal operating conditions.

Generally considered, the invention employs a displaceable chamber or shell connected to the boiler so that the water is contained in the chamber at a level in accordance with the water level in the boiler. Being mounted for gravity or weight displacement, the chamber is given the capacity for vertical movement in accordance with variations of its water content, and therefore in correspondence with the boiler water level changes. Downward displacement of the chamber occurs against yielding resistance, preferably of a coil spring by which the chamber is suspended. Control of the boiler water level is accomplished by regulation of the feed water valve by and in accordance with the chamber displacement. Preferably I employ a so-called quick opening valve, i. e., a feed water valve movable between fully open and closed positions, with relatively short travel, thus permitting both the sensitivity and capacity desired by reason of the characteristics of the valve control.

Objects of particular importance are to control the transmission of the chamber movement to the valve, in a manner assuring both proper stabilization of the valve against influence of pressure surges in the feed water line, and against such fluctuating or "hunting" movements as might otherwise correspondingly affect the boiler water level. Briefly, these objects are accomplished by imposing such resistance, or resistances, to the valve movement in response to the chamber travel, as will enable the chamber mass, acting through a yielding medium, to stabilize the valve against line pressure surges, and impose a resistance (preferably coming into effect sequentially in relation to the stabilizing resistance) which during slight or initial open positions of the valve, checks its further closing movements under the influence of the chamber, so as to prevent any considerable surges of liquid in the boiler whether by reason of expansion of the water or variations of its feed rate.

The invention has various additional features and objects, such as the preferred use of an ellipsoidal chamber shell, temperature stabilization of the shell supporting spring, and the linkage or level system, with its associated spring resistances for transmitting the shell movement to the valve. All these, as well as the details of an illustrative embodiment of the invention will be fully understood from the following description of the accompanying drawing, in which:

Fig. 1 is a general view illustrating a boiler feed water regulation adaptation of the liquid level control apparatus; and Fig. 2 is a fragmentary sectional view of a variational form of check device for resisting displacement of the weight responsive chamber.

Referring first to Fig. 1, the boiler conventionally indicated at 10, is shown to be equipped with the usual water column 11 carrying the gage glass 12 and having pipe connections 13 and 14 with the water and steam spaces in the boiler, respectively below and above the normal water level L. Feed water is supplied to the boiler through line 114 containing a control valve 15 preferably of a type which fully opens and closes in response to relatively short vertical travel of the valve stem 16. Accordingly, the valve fully opens from closed position upon short upward travel of its stem 16. Water leakage about the stem is prevented by extending it through an elongated tube 17 containing suitable seal means, the tube carrying a series of heat dissipating fins 18.

A weight responsive, vertically displaceable chamber 19, formed preferably by a hollow shell of ellipsoidal shape (circular in horizontal section) is in communication with the water and vapor spaces in the boiler, by way of flexible tubular lines 20 and 21 connecting by way of the valved nipples 22 and 23 with pipes 13 and 14. Line 20 preferably is made up of rigid pipe sections 24 and 25 having swivel joint connections at 26 and 27 which permit vertical displacement of the chamber 19. By virtue of the boiler and chamber communication through lines 13 and 20, the water stands in the chamber at a level corresponding closely to its level in the boiler. Preferably the chamber 19 is supported so that its long axis will correspond substantially to the normal water level L. The upper interior of chamber 19 is filled with steam by reason of its communication with the steam space in the boiler through line 21, the latter consisting typically of flexible copper tubing attached to the chamber shell by fitting 28.

The chamber 19 is suspended from a stationary support 29 by coil spring 30 attached at 31 to the chamber shell and connected to the support by a threaded bolt 32 carrying nut 33 which is adjustable to vary the vertical position of chamber 19 relative to any given water level. It is important that spring 30 be protected against such temperature variations as might result because of contraction or expansion of the spring, in suspension of chamber 19 at different elevations, all other conditions remaining the same. The spring is thermally stabilized by shielding it within a metallic heat conductive tube 34 extending from the chamber shell throughout the length of the spring and serving by reason of its conductivity of heat from the shell to maintain the temperature about the spring substantially constant.

Movement of the chamber 19 is communicated to the valve stem 16 through an appropriate mechanism, generally indicated at 36, acting to control and dampen transmission of the chamber movement to the valve in the respects discussed in the introduction. Typically the mechanism 36 is shown to comprise a lever 37 pivoted at 38 to rod 39 depending from the chamber 19, the opposite end of the lever being pivoted at 40 on a support 41 carried by a cross member 42 carried by the previously mentioned tube 17. The valve stem 16 carries a terminal clevice 421 receiving the lever 37 and pivotally attached thereto by pin 43. The latter engages within the bifurcated end 44 of an indicator 45 pivoted at 46 on a support 47 carried by the cross member 42, the support 47 carrying scale markings 48 traversed by the indicator 45 between fully opened and closed condition. It may be assumed that the indicator 45 is at its zero position at the upper end of the scale when the valve is fully closed.

Final closing movement of the valve is resisted by a stabilizer, generally indicated at 50, comprising typically a threaded stud 51 attached by connection 52 to the cross member 42 and carrying a head 53 slidable vertically on the stud. Downward movement of the head is resisted by coil spring 54 bearing against nut 55, threaded on the stud and adjustable therefor to vary the spring resistance to downward swinging of lever 37 upon its engagement with the head 53. The member 42 carries a second stabilizer or check 56 similar to the device 50 and comprising a lever engageable head 57 movable downwardly against the resistance of a coil spring 58 adjustably carried by the stud 59.

The invention broadly contemplates the use of any suitable type of device operating to impose resistance to valve closing movement of the lever 37. Instead of the described forms 50 or 56, I may use a dash-pot resistor 60 shown in Fig. 2 to comprise a cylinder 61 which contains a suitable non-freezing liquid such as glycerine. The cylinder contains a piston 62, vertical movement of which in either direction is resisted or checked, but not completely prevented, by restricted leakage of the fluid through slight clearance between the periphery of the piston and the cylinder wall. The piston rod 63 is pivotally attached at 64 to the lever 37, so that the latter is stabilized in both its up and down movements.

In considering the operation of the system, assume the boiler water level to be such that valve 15 is partially open with indicator 45 at its corresponding position as shown in Fig. 1. Assume then a continuing rise of the water level in both the boiler and chamber 19 so that the effective increased weight of the latter cause the chamber to lower against the resistance of spring 30 and to displace lever 37 downward in a valve closing direction. Following a relatively slight initial movement, the lever engages the stabilizer 50 which thereafter resists continued movement of the lever in a valve closing direction, sufficiently to stabilize the valve 15 against fluctuations which otherwise might tend to occur by reason of any pulsations transmitted to the valve by the feed water being delivered through line 14. As the valve closes, and after stabilizer 50 has come into effect, lever 37 engages the check 56 which imposes a further and preferably somewhat stronger resistance, to continued closing of the valve. Accordingly, the function of the check is to further stabilize the valve action in its responsiveness to changes of the boiler water level, and therefore the movement of chamber 19, in the respect that the valve will not be permitted to "hunt" or fluctuate between extreme positions as the water level changes. For example in the event of a relatively abrupt up-surge of the liquid level, whether because of the water expansion or for any other reason, the valve 15 will not suddenly close, but will be throttled down to a still open condition considerably decreasing, but not discontinuing, the feed water delivery to the boiler. By proper adjustment of the check 56, it is found that the water level may be maintained remarkably close to constant position, to complete elimination of the extreme or relatively wide surge range permitted by the ordinary control equipment. Should however an extreme upsurge of liquid occur in the chamber 19, the control mechanism 36 will permit complete closing of the valve. As will be understood from the foregoing, upon lowering of the water level, chamber 19 rises, with its motion being transmitted through the mechanism 36 to open the valve.

Further in connection with the functions and relationships of the stabilizer 50 and limit check 56, it is to be observed that each acts to stabilize the valve against hunting fluctuations when the valve is sufficiently closed that the lever exerts some compression on the stabilizer and check springs. The limit check 56 however has the further function, and particularly by reason of its stronger spring 58 (as compared with the stabilizer spring 54), of substantially arresting closing of the valve when it is passing just about enough water to meet the minimum steaming demand on the boiler. The check however is not a positive or complete stop which might allow flooding of the boiler, but one which will not permit complete closure of the valve until an abnormal rise (say ½") of water occurs in chamber 19. By keeping a minimum or restricted flow of water to the boiler, the control effectively prevents the water swell in the boiler that occurs in the absence of the cooling effect of incoming water, and prevents also the water shrinkage that ordinarily occurs when cool water is again admitted to the boiler after complete shutoff.

I claim:

1. Apparatus for controlling the level of liquid in a vessel supplied with liquid under control of a feed regulating valve, comprising a chamber, flexible connections for placing said chamber in communication with the liquid and vapor spaces in the vessel so that the liquid is carried in the chamber at a level in accordance with its level in said vessel and the chamber is vertically displaceable in response to variations of its liquid content, a spring resisting displacement of the chamber, a shield enclosing said spring along substantially its entire extent to stabilize its temperature, and a mechanism actuated by the movements of said chamber for operating said valve.

2. Apparatus for controlling the level of liquid in a vessel supplied with liquid under control of a feed regulating valve, comprising a chamber, flexible connections for placing said chamber in communication with the liquid and vapor spaces in the vessel so that the liquid is carried in the chamber at a level in accordance with its level in said vessel and the chamber is vertically displaceable in response to variations of its liquid content, a coil spring for suspending said chamber from an overlying support, tubular heat conductive shield extending from the chamber in heat transferring relation therewith and disposed about the spring to stabilize its temperature, and a mechanism actuated by the movements of said chamber for operating said valve.

3. Apparatus for controlling the level of liquid in a vessel supplied with liquid under control of a feed regulating valve, comprising a chamber, flexible connections for placing said chamber in communication with the liquid and vapor spaces in the vessel so that the liquid is carried in the chamber at a level in accordance with its level in said vessel and the chamber is vertically displaceable in response to variations of its liquid content, and a mechanism actuated by the movements of said chamber for operating said valve, said mechanism comprising a lever connectible with the chamber and valve for transmission of movement therebetween, a first spring acting against the lever to resist transmission of downward movement of the chamber to the valve, and a second spring acting against the lever to resist said transmission sequentially with relation to the resistive effectiveness of said first spring, said springs being positioned in proximate side-by-side relation and acting against the lever at different locations therealong.

4. Apparatus for controlling the level of liquid in a vessel supplied with liquid under control of a valve, comprising a shell of substantially ellipsoidal shape positioned horizontally with relation to its large diameter, flexible connections for placing the upper and lower interiors of the shell in communication with the vapor and liquid spaces in the vessel so that the liquid is carried in the shell at a normal level corresponding to the maximum shell dimension and the shell is vertically displaceable in response to variations of its liquid content, a coil spring suspending said shell, a tubular heat conductive sleeve extending upwardly from the shell in heat transferring relation therewith and surrounding the spring to stabilize the temperature thereof, a rod depending from the shell, and a mechanism actuated by the movement of the shell and rod to operate said valve.

5. Apparatus for controlling the level of liquid in a vessel supplied with liquid under control of a feed regulating valve, comprising a chamber, flexible connections for placing said chamber in communication with the liquid and vapor spaces in the vessel so that the liquid is carried in the chamber at a level in accordance with its level in said vessel and the chamber is vertically displaceable in response to variations of its liquid content, a coil spring connected to an upper side of and suspending said chamber, a member carried by and at the under side of said chamber, and a mechanism operable by said member to transmit downward movement of said chamber to the valve in a valve closing direction, said mechanism including a lever connected to said member and valve to transmit movement therebetween, a second spring acting against the lever to resist transmission of downward movement of the chamber to the valve, and a third spring acting against the lever to resist said transmission sequentially with relation to the resistive effectiveness of said second spring.

6. Apparatus for controlling the level of liquid in a vessel supplied with liquid under control of a feed regulating valve, comprising a chamber, flexible connections for placing said chamber in communication with the liquid and vapor spaces in the vessel so that the liquid is carried in the chamber at a level in accordance with its level in said vessel and the chamber is vertically displaceable in response to variations of its liquid content, a spring resisting displacement of the chamber, a shield enclosing a major portion of the spring in all conditions thereof to stabilize its temperature, and a mechanism actuated by the movements of said chamber for operating said valve.

JULIAN A. CAMPBELL.

REFERENCES CITED

The following references are of record in the file of this patent:

UNITED STATES PATENTS

| Number | Name | Date |
|---|---|---|
| 88,774 | Chase | Apr. 13, 1869 |
| 407,991 | Brown | July 30, 1889 |
| 483,669 | Dreux | Oct. 4, 1892 |
| 644,688 | Shattuck | Mar. 6, 1900 |
| 727,018 | Stephens | May 5, 1903 |
| 783,936 | Barrett | July 21, 1903 |
| 799,947 | Spanabel | Sept. 19, 1905 |
| 856,549 | Senter | June 11, 1907 |
| 1,180,481 | Eames | Apr. 25, 1916 |
| 1,234,413 | Swain | July 24, 1917 |
| 1,588,049 | Qualey | June 8, 1926 |
| 1,641,612 | Atkins | Sept. 6, 1927 |
| 1,742,746 | Zubaty | Jan. 7, 1930 |
| 1,825,637 | Ricker | Sept. 29, 1931 |
| 2,133,190 | Dalton | Oct. 11, 1938 |
| 2,248,322 | Annin | July 8, 1941 |
| 2,281,444 | Julin | Apr. 28, 1942 |

FOREIGN PATENTS

| Number | Country | Date |
|---|---|---|
| 342,582 | France | July 11, 1904 |